United States Patent [19]
Silverstein

[11] Patent Number: 5,822,469
[45] Date of Patent: Oct. 13, 1998

[54] POST-FILTER FOR IMPROVING HALFTONE IMAGE SHARPNESS

[75] Inventor: D. Amnon Silverstein, Hayward, Calif.

[73] Assignee: Hewlett-Packard Company, Palo Alto, Calif.

[21] Appl. No.: 734,821

[22] Filed: Oct. 22, 1996

[51] Int. Cl.⁶ .............................. G06K 9/40; H04N 1/40
[52] U.S. Cl. .................. 382/267; 382/254; 382/263; 382/266; 358/456; 358/458
[58] Field of Search ..................... 382/254, 260, 382/263, 266, 267, 274, 195, 199, 203, 204, 205; 358/455, 456, 458, 464

[56] References Cited

U.S. PATENT DOCUMENTS

| | | | |
|---|---|---|---|
| 4,926,267 | 5/1990 | Shu et al. | 358/456 |
| 4,992,955 | 2/1991 | Yabuuchi et al. | 358/456 |
| 5,068,914 | 11/1991 | Klees | 382/205 |

*Primary Examiner*—Thomas D. Lee

[57] ABSTRACT

A post-filtering method and apparatus for increasing the high-frequency and edge information of halftoned images is described. If a continuous-tone (contone) image is processed by a halftoning algorithm into a binary or multi-level image, some of the high frequency information is lost. However, some of the lost information can be restored by judiciously rearranging some of the halftone picture elements (pixels). Each horizontally adjacent pair of pixels in the contone image are compared with each other. If the difference between their luminance is greater than a threshold, then the corresponding pair of adjacent pixels in the halftone image are compared. If the difference between the halftone image pixels has the opposite sign of the differences between the contone image pixels (e.g., the image changes from dark to light, but the halftone pixels change from light to black), the two halftone pixels are exchanged with each other. The procedure is then repeated in the vertical direction. The procedure can be applied as a post filter to any halftoned image, and can substantially improve the image quality. The procedure works with binary, multiple gray level and color images. The procedure is also reasonably fast to compute.

10 Claims, 7 Drawing Sheets

POST-FILTER FOR IMPROVING HALFTONE IMAGE SHARPNESS

BACKGROUND OF THE INVENTION

1. Field of the Invention

The present invention relates to digital image processing and, more particularly, to processing halftone images.

2. Description of the Related Art

In halftone imaging, there is a trade-off between resolution and gray-scale rendition. Broad pixel distribution is required for gray level rendition, but precise local pixel positioning is required for edge and feature localization. Halftone methods seek a compromise solution to the simultaneous goals of gray scale and spatial rendition, and thus tend to unsharpen images to some degree.

In the past, the unsharpening effect of halftoning has been partially compensated for by means of a presharpening stage. See R. Ulichney, *Digital Halftoning*, MIT press, 1987. The continuous tone (contone) image is edge-enhanced before the halftoning stage. This has a number of disadvantages. The presharpening stage utilizes a filtering operation such as the Laplacian filter (see G. Baxes, *Digital Image Processing*, Prentice-Hall Inc., 1984), which requires extensive computation. In addition, noise in the original is amplified and smooth regions of the image may become textured. Furthermore, presharpening can only partially compensate for the unsharpening effects of the halftoning. An edge, despite having high contrast, may still be disrupted by poor pixel positioning in the output.

A sophisticated strategy for reshaping the dots in clustered-dot dithers has been previously described by other researchers. See Rick A. Vander Kam, Ping Wah Wong, "Edge Enhancement for Clustered-Dot Halftones", Hewlett-Packard Laboratories Technical Report, 1994. The reshaping method is restricted to clustered-dot dithers, however, and requires significant computation time.

Thus, it can be seen that halftone image sharpening techniques impose computational and area of application limits upon halftone image output devices, and hinder the use of these devices in many applications.

Therefore, there is an unresolved need for a technique that can improve halftone image sharpness without imposing a great computational burden.

SUMMARY OF THE INVENTION

A post-filtering method and apparatus for increasing the high-frequency and edge information of halftoned images is described. If a continuous-tone (contone) image is processed by a halftoning algorithm into a binary or multi-level image, some of the high frequency information is lost. However, some of the lost information can be restored by judiciously rearranging some of the halftone picture elements (pixels).

Each horizontally adjacent pair of pixels in the contone image are compared with each other. If the difference between their luminance is greater than a threshold, then the corresponding pair of adjacent pixels in the halftone image are compared. If the difference between the halftone image pixels has the opposite sign of the differences between the contone image pixels (e.g., the image changes from dark to light, but the halftone pixels change from light to black), the two halftone pixels are exchanged with each other. The procedure is then repeated in the vertical direction.

The procedure can be applied as a post filter to any halftoned image, and can substantially improve the image quality. The procedure works with binary, multiple gray level and color images. The procedure is also reasonably fast to compute.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–7. Those skilled in the art will readily appreciate that the detailed description given herein with respect to these figures is for explanatory purposes, however, because the invention extends beyond these limited embodiments.

Figure 1:
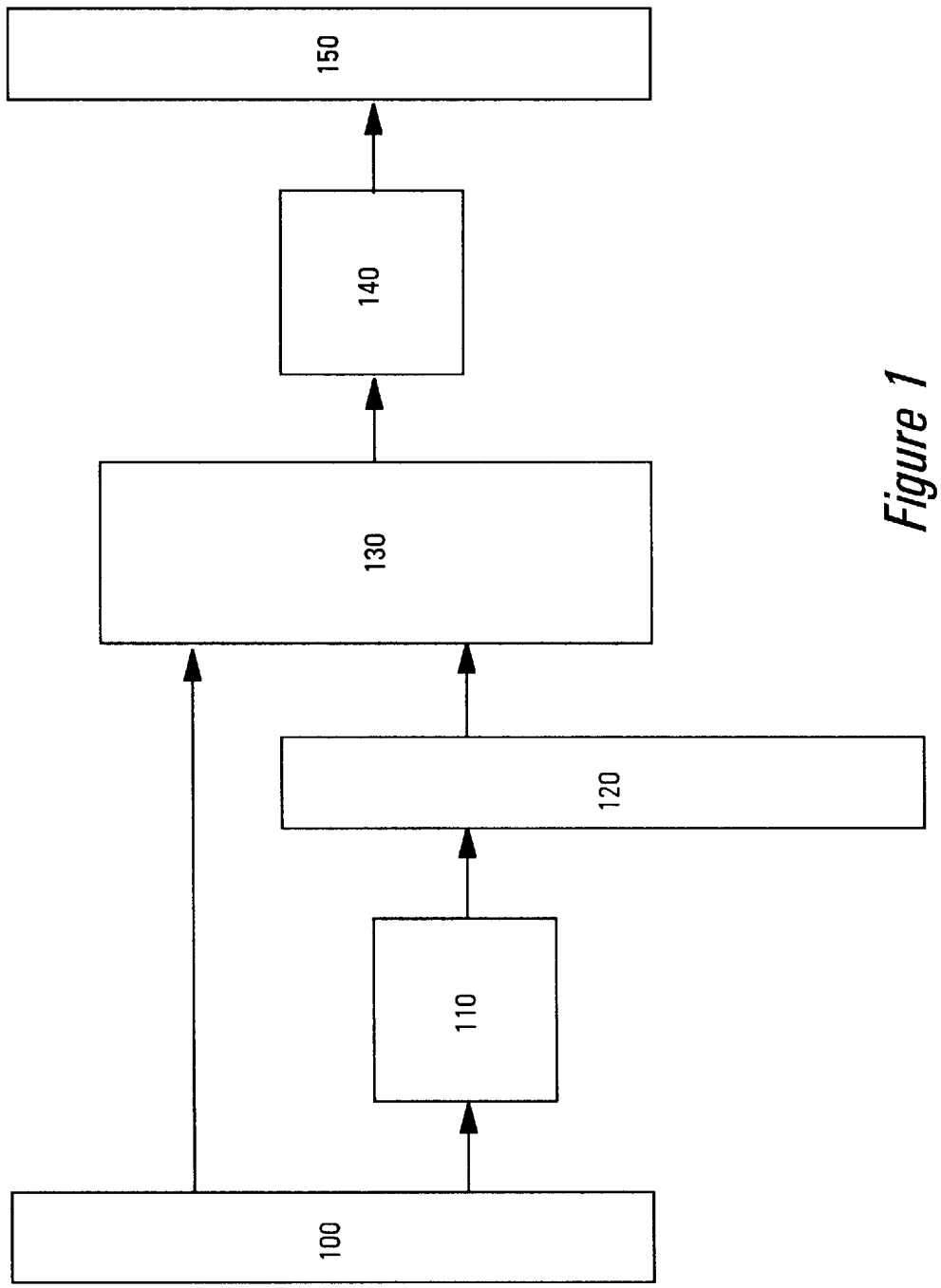
FIG. 1 is a block diagram illustrating an apparatus for processing and displaying a halftoned digital image using a post-processing halftone filter according to the present invention.

FIG. 1 is a block diagram illustrating an apparatus for processing and displaying a halftoned digital image using a post-processing halftone filter according to the present invention. In FIG. 1, digital (contone) image 100 is processed by a halftoning processor 120 to yield halftone image 130 using any of the various halftoning techniques known in the art. For example, contone image 100 can be halftoned with the Floyd-Steinberg error diffusion method. See R. W. Floyd and L. Steinberg, "Adaptive Algorithm for Spatial Gray Scale", SID Int. Sym. Digest of Tech. Papers, 36–37, 1975.

Edge-sharpening processor 130 operates on contone image 100 and halftone image 120 to yield sharpened image 150 which is produced by output device 140.

Figure 2:
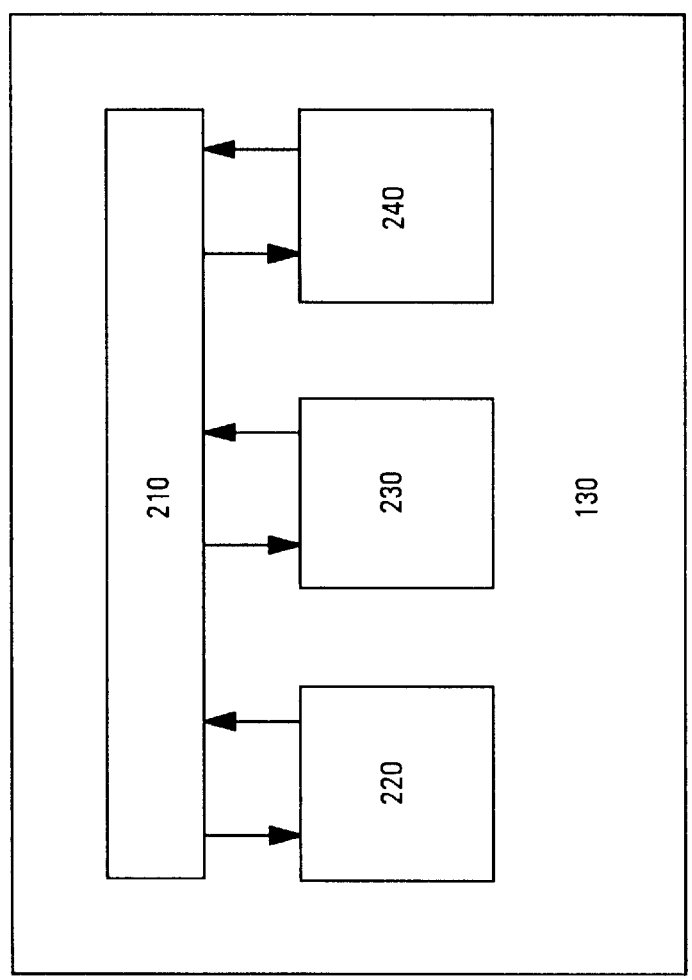
FIG. 2 is a block diagram illustrating an edge-sharpening apparatus suitable for applying a post-processing halftone filter according to the present invention.

FIG. 2 is a block diagram illustrating an embodiment of an edge-sharpening apparatus suitable for applying a post-processing halftone filter according to the present invention. Edge-sharpening processor 130 includes controller 210, gradient comparer 220, sign comparer 230 and pixel value swapper 240.

Controller 210 controls operation of the edge-sharpening filter 130 such that each horizontally adjacent pair of pixels in the contone image are compared with each other. If pixel gradient calculator 220 determines that a contone pixel gradient (i.e., the difference between the contone image pixel pair luminances) is greater than a threshold, then the corresponding pair of adjacent pixels in the halftone image are compared. If sign comparer 230 determines that the difference between the halftone image pixels has the opposite sign of the differences between the contone image pixels (e.g., the image changes from dark to light, but the halftone pixels change from light to black), the two halftone image pixels being examined have their pixel values exchanged with each other by pixel value swapper 240. The procedure is then repeated in the vertical direction.

Figure 3A:
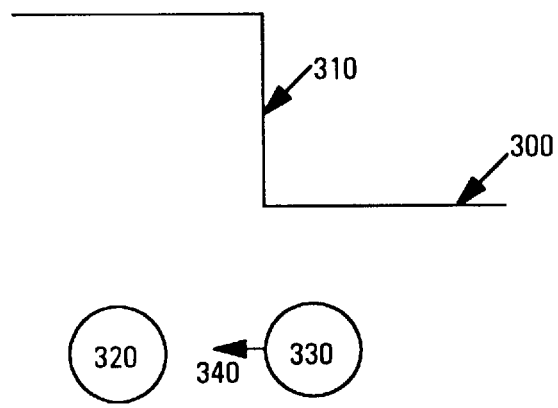
FIGS. 3A and 3B are drawings that together illustrate edge sharpening through interchange of pixel values as practiced according to one embodiment of the present invention.
Figure 3B:
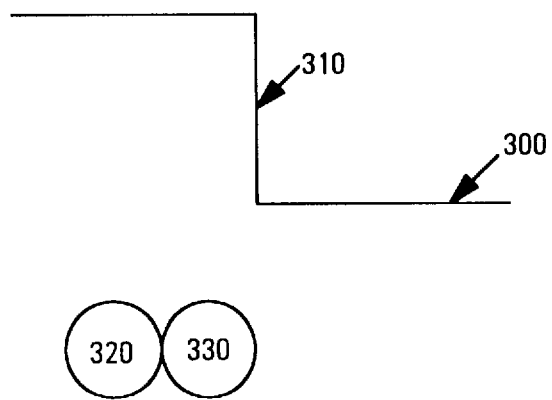

FIG. 3A and 3B are drawings that together illustrate edge sharpening through interchange of pixel values as practiced according to one embodiment of the present invention. FIG. 3A and 3B are respective illustrations of before and after swapping cases. Stepped line 300 represents luminance in the contone image as viewed along a direction of the image (e.g., along a row or column). The stepped line 300 has a portion where luminance changes along the direction, i.e., stepped line 300 has an edge 310. Circles 320 and 330 represent dark pixels within a corresponding portion of the halftone image.

FIG. 3A depicts the case after halftoning but before sharpening. The dark pixels 320 and 330 of the halftone image are not aligned with the edge 310 in the contone image. Thus, where the contone image transitions from dark to light, the halftone image transitions from light to dark.

FIG. 3B illustrates the effect of applying the post processing edge sharpener to the halftone image. The pixel values for the halftone image pixels corresponding to the contone image pixels at the edge 310 have been swapped, effectively moving circle 330 one pixel in direction 340. Thus, after processing, where the contone image transitions from dark to light, the halftone image also transitions from dark to light, thereby achieving the desired effect of sharpening the edge in the halftone image.

Figure 4:
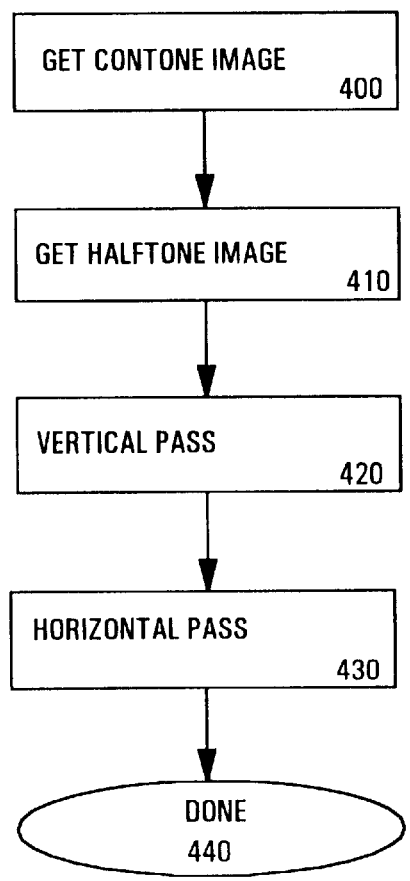
FIG. 4 is a flow chart illustrating post-processing filtration of a halftone digital image as practiced according to one embodiment of the present invention.

FIG. 4 is a flow chart illustrating post-processing edge sharpening of a digital halftone image as practiced according to one embodiment of the present invention. In FIG. 4, it can be seen that the contone image and the halftone image to process are first retrieved (processes 400 and 410, respectively). The halftone image is then sharpened using vertical and horizontal passes (processes 310 and 320, respectively) prior to termination 340.

Figure 5:
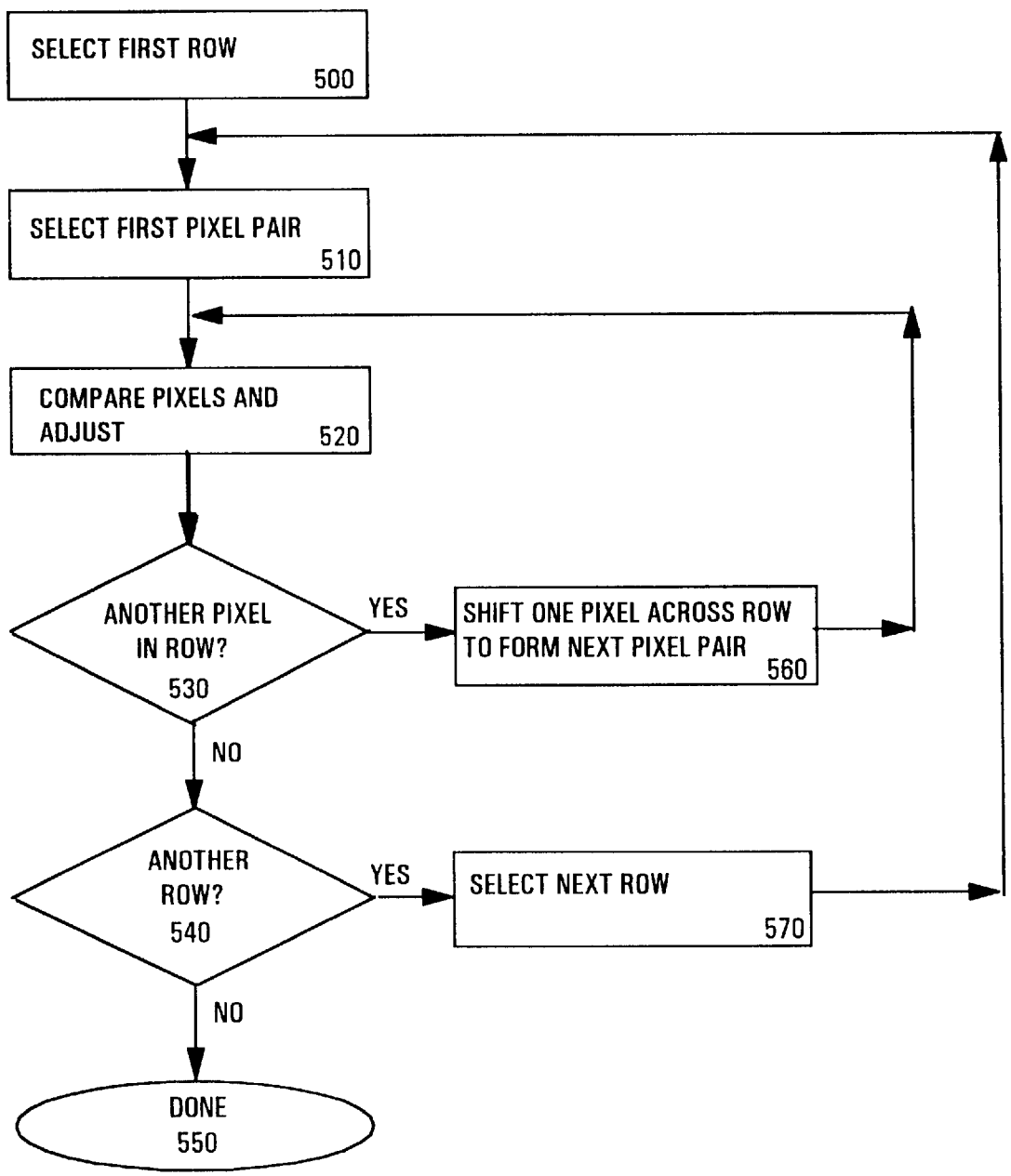
FIG. 5 is a flow chart illustrating a vertical pass for the post-processing filtration of a digital halftone image as practiced according to one embodiment of the present invention.
Figure 7:
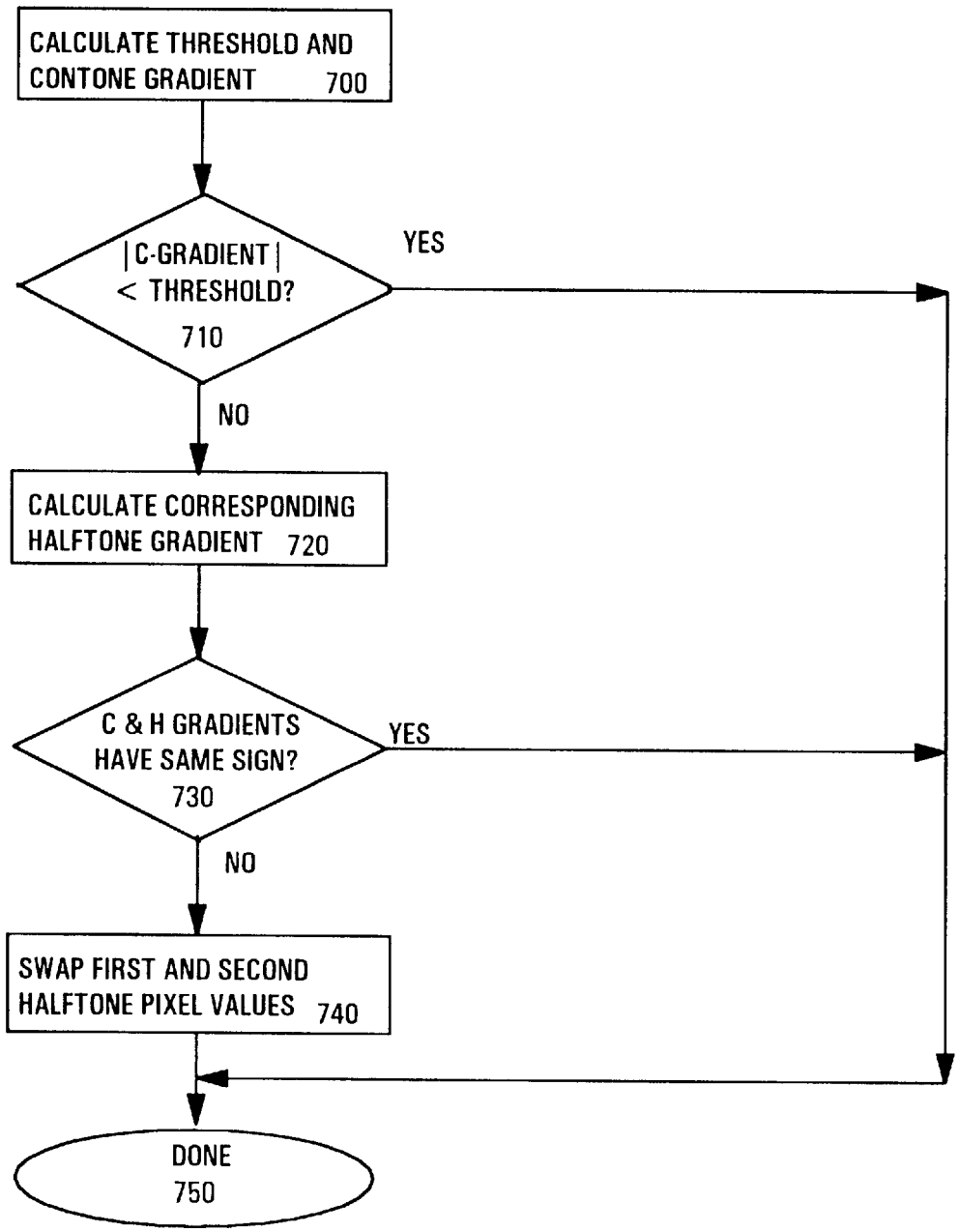
FIG. 7 is a flow chart illustrating the edge sharpening portion of the post-processing filter of a digital halftone image as practiced according to one embodiment of the present invention.

FIG. 5 is a flow chart illustrating a vertical pass for the post-processing filtration of a digital halftone image as practiced according to one embodiment of the present invention. The first row of the halftone image to be processed is selected in process 500 and the first pixel pair of the row is selected in process 510. Within the context of the vertical pass of FIG. 5, a pixel pair is a pair of contiguous pixels in the selected row. The first pixel pair is selected to be the first and second pixels from one end of the row. The comparison of pixels and edge sharpening adjustment to the halftone image (if required) is achieved in process 520. FIG. 7, discussed later, is a flow chart illustrating the edge sharpening portion of the post-processing filter of a digital halftone image as practiced according to one embodiment of the present invention.

Returning to FIG. 5, a test is performed in decision block 530 to determine whether there is at least one more pixel in the selected row. If there is another pixel in the row, a shift by one pixel across the row is performed in process 560 to form the next selected pixel pair.

If there is not another pixel in the row, then a test is performed in decision block 540 to determine whether there is at least one more row in the image. If there is another row in the image, a shift by one row in the image is performed in process 570 to form the next selected row. Processing terminates at terminal 550 when all rows have been processed.

Figure 6:
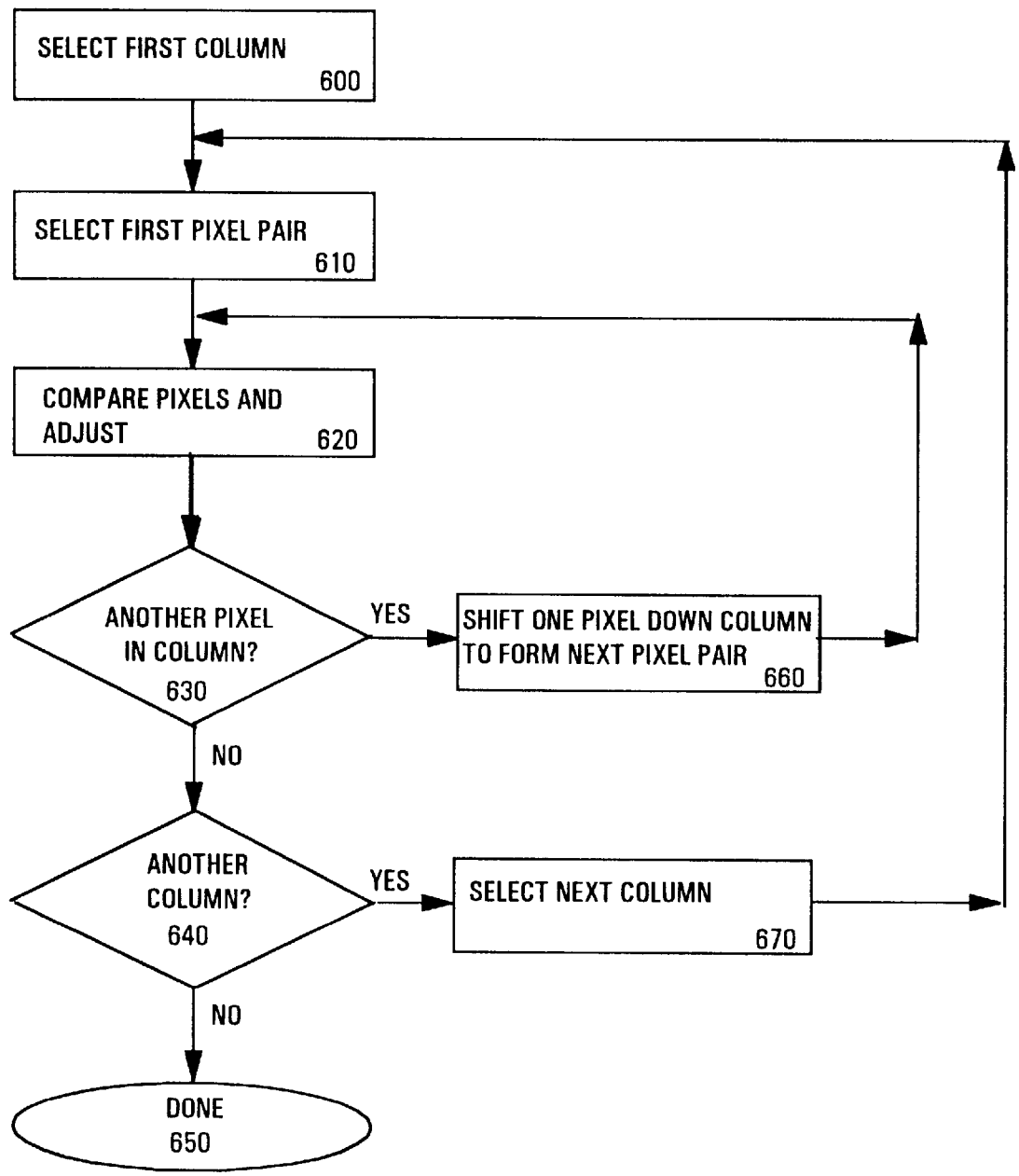
FIG. 6 is a flow chart illustrating a horizontal pass for the post-processing filtration of a digital halftone image as practiced according to one embodiment of the present invention.

Similarly, FIG. 6 is a flow chart illustrating a horizontal pass for the post-processing filtration of a digital halftone image as practiced according to one embodiment of the present invention. The first column of the halftone image to be processed is selected in process 600 and the first pixel pair of the column is selected in process 610. Within the context of the horizontal pass of FIG. 6, a pixel pair is a pair of contiguous pixels in the selected column. The first pixel pair is selected to be the first and second pixels from one end of the column. The comparison of pixels and edge sharpening adjustment to the halftone image (if required) is achieved in process 620. FIG. 7, discussed later, is a flow chart illustrating the edge sharpening portion of the post-processing filter of a digital halftone image as practiced according to one embodiment of the present invention.

Returning to FIG. 6, a test is performed in decision block 630 to determine whether there is at least one more pixel in the selected column. If there is another pixel in the column, a shift by one pixel down the column is performed in process 660 to form the next selected pixel pair.

If there is not another pixel in the column, then a test is performed in decision block 640 to determine whether there is at least one more column in the image. If there is another column in the image, a shift by one column in the image is performed in process 670 to form the next selected column.

Processing terminates at terminal 650 when all columns have been processed.

Returning to FIG. 7, a flow chart illustrating the edge sharpening portion of the post-processing filter of a digital halftone image as practiced according to one embodiment of the present invention is shown. A threshold and contone gradient (C-gradient) is calculated in process 700. The contone gradient is calculated as being the change in luminance between the contone image pixel pair associated with the currently selected halftone image pixel pair.

For the embodiment illustrated in FIG. 7, the threshold is calculated to be a proportion of one of the associated contone pixel values. Various threshold calculation schemes are possible, e.g., a proportion of the greater valued pixel, a proportion of the lesser valued pixel, a proportion of the mean of the two pixels, or a proportion of either of the pixels selected randomly. each of these schemes has the effect of adjusting the threshold proportionately based upon the values of the contone images under consideration. Thus, the threshold will represent a greater change in bright areas than in dark areas.

Alternately, the threshold calculation can be eliminated by making the threshold simply be a constant value representing an absolute brightness change.

In decision block 710, a test is performed to determine whether the absolute value of the halftone gradient exceeds the threshold, representing an edge in the contone image. Thus decision block 710 detects the case where either the first pixel is significantly darker than the second pixel of the contone pixel pair, or where the second pixel is significantly darker than the first pixel of the contone pixel pair. If the absolute value of the contone gradient does not exceed the threshold, then no adjustment to the halftone image is required and the process terminates at terminal block 750.

If the absolute value of the contone gradient does exceed the threshold, then an adjustment to the halftone image may be required and the corresponding halftone gradient (H-gradient) is calculated in process 720. The halftone gradient is calculated as being the change in luminance between the currently selected halftone image pixel pair. In the case of a binary halftone image, the halftone gradient will have a binary value. Alternately, in the case of a non-binary halftone image, the halftone gradient will have a greater range. In such a case, the halftone gradient can be thresholded in the manner that the contone threshold was (i.e., decision block 710).

In decision block 730, a test is performed to determine whether contone and halftone gradients have the same sign. If they have the same sign, then no sharpening is required and the process terminates at terminal block 750.

If the contone and halftone images do not have the same sign, then an adjustment to the halftone image pixel values is made in process 750. Specifically, the first and second pixel values are interchanged (i.e., swapped). Processing then terminates at terminal 630.

As mentioned previously, a sophisticated strategy for reshaping the dots in clustered-dot dithers has been previously described by other researchers. See Rick A. Vander Kam, Ping Wah Wong, "Edge Enhancement for Clustered-Dot Halftones", Hewlett-Packard Laboratories Technical Report, 1994. The halftone sharpening method presented here complements this technique. The new method is particularly effective at sharpening dispersed-dot dithers whereas the previous method is restricted to clustered-dot dithers. The new method also requires far less time to compute, although the results may be less satisfactory for clustered-dot patterns than the previously described technique.

For one embodiment, the halftone sharpening method presented herein has been implemented as a C function with an interface to the Matlab programming language (Matlab, The MathWorks, Inc. MA, 1993). For one embodiment, the function requires three arguments: a matrix of image pixel luminance values stored as real numbers (the contone), a matrix of halftone pixel luminance values (which may have any number of discrete gray-values), and a threshold. The threshold is the minimum difference between adjacent contone pixels that may result in an adjustment of the halftone pixels. A smaller value results in more sharpening, but if the value is too small the algorithm may introduce some visible artifacts.

The new algorithm can be applied as a post filter to any halftoned image, and it can substantially improve the image quality. It works with binary, multiple gray level and color images. It is reasonably fast to compute.

Although the post-processing edge sharpener has been presented herein as operating on every row and column of the halftone image, alternate embodiments are possible. for example, every other line and every other column can produce acceptable sharpening results and reduce calculation time to a quarter of that incurred if every line and column is processed.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An edge sharpening method for a halftone image, the method comprising the steps of:

selecting a contiguous halftone pixel pair in the halftone image;

calculating a contone gradient for a contone pixel pair associated with the halftone pixel pair;

if the contone gradient exceeds a threshold, calculating a halftone gradient; and if the contone and halftone gradients have different signs, interchanging pixel values for the halftone pixel pair.

2. The method as set forth in claim 1, further comprising the step of calculating the threshold.

3. The method as set forth in claim 1, further comprising the step of calculating the threshold based upon at least one pixel value of the contone pixel pair.

4. The method as set forth in claim 1, further comprising the step of calculating the threshold based upon a proportion of at least one pixel value of the contone pixel pair.

5. The method as set forth in claim 1, further comprising the step of determining if the halftone gradient exceeds a halftone threshold.

6. An edge sharpening apparatus for a halftone image, the apparatus comprising:

a controller to select a contiguous halftone pixel pair in the halftone image;

a gradient comparer to calculate a contone gradient for a contone pixel pair associated with the halftone pixel pair, compare the contone gradient to a threshold and calculate a halftone gradient for the halftone pixel pair if the contone gradient exceeds the threshold;

a sign comparer to compare the contone and halftone gradient signs; and a pixel value swapper to interchange pixel values for the halftone pixel pair if the contone and halftone gradients have different signs.

7. The apparatus as set forth in claim 6, wherein the gradient comparer calculates the threshold.

8. The apparatus as set forth in claim 6, wherein the gradient comparer calculates the threshold based upon at least one pixel value of the contone pixel pair.

9. The apparatus as set forth in claim 6, wherein the gradient comparer calculates the threshold based upon a proportion of at least one pixel value of the contone pixel pair.

10. The apparatus as set forth in claim 6, wherein the gradient comparer determines if the halftone gradient exceeds a halftone threshold.

* * * * *